United States Patent [19]

Roesler

[11] 4,316,634
[45] Feb. 23, 1982

[54] SEAT MOUNTING APPARATUS

[76] Inventor: Layton S. Roesler, 3515 Mound St., Ventura, Calif. 93003

[21] Appl. No.: 89,565

[22] Filed: Oct. 29, 1979

[51] Int. Cl.³ .............................................. A47C 1/02
[52] U.S. Cl. .................. 297/349; 248/416; 297/162
[58] Field of Search .............. 297/349, 160, 161, 162; 248/416, 415, 418, 425, 282

[56] References Cited

U.S. PATENT DOCUMENTS

| 2,164,390 | 7/1939 | Dickerson | 248/282 |
| 3,708,203 | 1/1973 | Barecki et al. | 248/416 |
| 3,964,713 | 6/1976 | Joslyn | 248/418 |
| 3,968,992 | 7/1976 | Hogan | 297/162 |
| 4,023,760 | 5/1977 | Robinson | 248/416 |

FOREIGN PATENT DOCUMENTS 93636  11/1958  Denmark .......................... 297/160

Primary Examiner—James T. McCall
Attorney, Agent, or Firm—Jack C. Munro

[57] ABSTRACT

A seat mounting apparatus which has a base which has a cylindrical upright post extending therefrom forming a first pivot axis. An elongated member having a longitudinal center axis is pivotally mounted on the upright post with the longitudinal center axis being located substantially perpendicular to the first pivot axis. The elongated member is pivotally mounted on a second post forming a second pivot axis. The second pivot axis is spaced from the first pivot axis. The second post is fixedly secured to an attaching plate which is to be attached to the bottom of a seat. Fixing means are to be connected to the elongated member for fixing the position of the elongated member with respect to each post. A supportive tray, as a separate attachment, is to be pivotally mounted with respect to the attaching plate.

7 Claims, 5 Drawing Figures

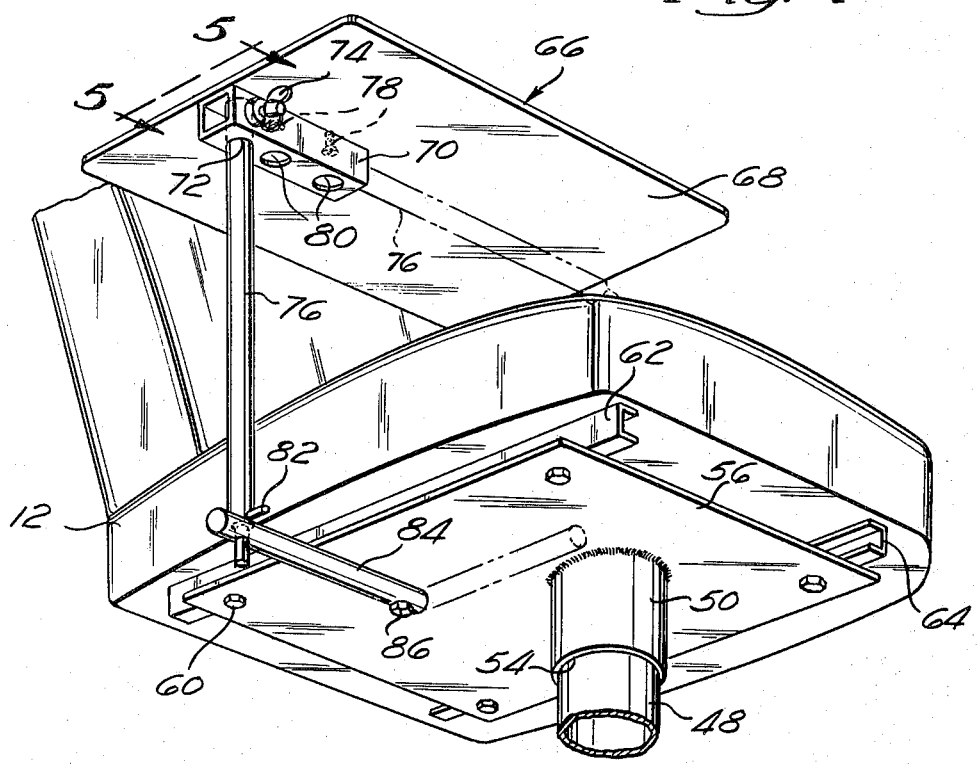
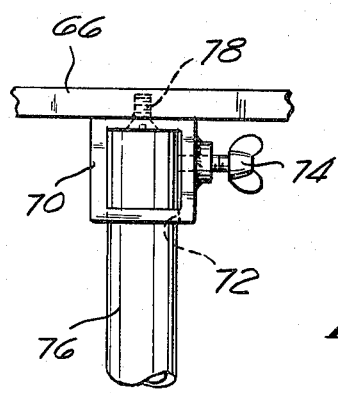

SEAT MOUNTING APPARATUS

BACKGROUND OF THE INVENTION

The field of this invention relates to seat mounting apparatuses and more particularly to a seat mounting apparatus for confined quarters, such as within the inside of a vehicle wherein it is desired to have the seat to be movable to face in different directions.

Within vehicles, commonly known as recreational vehicles, the passenger and driver's seats are normally located so as to position the occupant along with the forward direction of movement of the vehicle. When the vehicle is not moving, it would be desirable to have the seat be positionable in a different position, such as to the rear of the vehicle.

Previously, it has been known to swively mount such a vehicle seat. However, recreational vehicles frequently have an enlarged raised console located between the passenger seat and the driver's seat. Also, there may be other structure adjacent the seats which makes it difficult to swivel the seat and position the seat in the rearwardly facing direction.

There is a need to incorporate seat mounting structures for such a confined quarter situation, in which not only does the seat swivel, but it also swings so that a wider degree of movement is achieved so that the seat can be moved around the aforementioned obstacles to be located in a particular desired location.

SUMMARY OF THE INVENTION

The structure of this invention is summarily described in the Abstract of the Disclosure and reference is to be had thereto.

The primary objective of this invention is to provide a seat mounting apparatus for a vehicular seat wherein the seat can be readily swiveled and swung to a substantially rearward facing position within the vehicle opposed to its normally forwardly facing position toward the direction of movement of the vehicle.

Another objective of this invention is to construct the seat mounting apparatus with few parts which can be readily assembled and connected to existing vehicular seat structure requiring no special installing skills.

Another objective of this invention is to construct a seat mounting apparatus which can be optionally located in either the right handed position or left handed position.

BRIEF DESCRIPTION OF THE DRAWINGS

FIG. 4 is an isometric view of the seat mounting apparatus of this invention showing the optional tray attachment which is connected thereto; and FIG. 5 is a segmental view of a portion of the tray mounting structure taken along line 5—5 of FIG. 4.

DETAILED DESCRIPTION OF THE SHOWN EMBODIMENT

Figure 1:
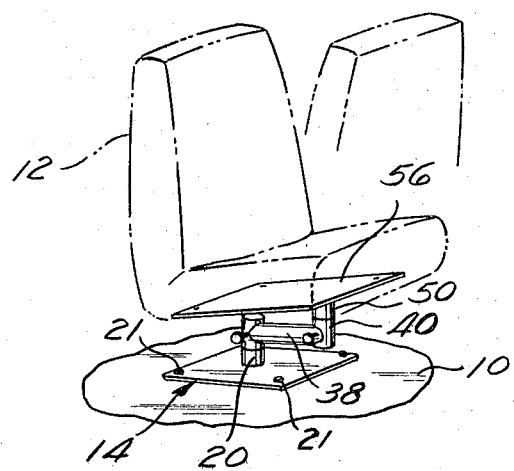
FIG. 1 is an isometric view of a seat mounting apparatus of this invention showing its connection with a seat and depicting how the seat can be moved to different positions.

Referring particularly to the drawings, there is shown a supportive surface 10, such as of a floor of a vehicle such as a recreational vehicle. A seat 12 is located within the vehicle and is to be mounted on the supportive surface 10. Seat mounting apparatus 14 of this invention is to mount the seat 12 upon the supportive surface 10.

The apparatus 14 includes a planar base 16. The planar base 16 includes a plurality of apertures 18 formed therein. Each aperture 18 is to cooperate in a conventional manner with a conventional fastener 21 to secure the base 16 to the supportive surface 10.

Centrally mounted and fixedly secured to the base 16 is an upright post assembly 20. The upright post assembly 20 includes a smaller diametered section 22. An opening 24 is formed within the smaller diametered section 22. A flange 26 is formed between the enlarged section of the upright post assembly 20 and the smaller diametered section 22.

The smaller diametered section 22 is to be telescopingly mounted within a first sleeve 28. The sleeve 28 is to abut flange 26. Sleeve 28 is to be pivotal with respect to the upright post assembly 20 about a first pivot axis. The first pivot axis is located perpendicular with respect to the plane of the base 16. It is to be noted that the sleeve 28 can be mounted on the smaller diametered section 24 from either direction and from either end. When it is so mounted, the cap 30 is employed to close off the open end of the sleeve 28.

A first means in the form of a threaded member 32 is threadably secured within a hole 34 formed within the side wall of the sleeve 28. The threaded member 34 is to be manually movable by means of a knob 36 mounted on its outer end thereof. The threaded member 32 is to be movable into engagement with the opening 24 to securely lock together the sleeve 28 and the upright post assembly 20. Disengaging the threaded member 32 from the opening 24 permits pivoting of the sleeve 28 with respect to the upright post assembly 20.

Fixedly secured to the side wall of the sleeve 28 and extending transversely therefrom is a center member 38. The free end of the center member 38 connects to a second sleeve 40. The second sleeve 40 also includes a hole 42 formed in the side wall thereof. A threaded member 44, which is secured at its outer end to a knob 46, is threadedly mounted within the hole 42 in a manner similar to threaded member 32. It is to be noted that the threaded members 44 and 32 and mounted on the same longitudinal side of the elongated member constructed of sleves 28 and 40 and center member 38.

A smaller diametered section 48 of the second post 50 is to telescopingly interconnect with the sleeve 40. An opening 52 is formed within the smaller diametered section 48. A flange 54 is formed between the enlarged of the upright post assembly 50 and the smaller diametered section 48. The flange 54 is to abut against an end of the sleeve 40. The upright post assembly 50 is pivotally mounted with respect to the sleeve 40 by a second pivot axis. The second pivot axis is located parallel to the first pivot axis but is spaced therefrom. The threaded member 44 is to be connectable with the opening 42 to fixedly secure together the second upright post assembly 50 to the sleeve 40.

Figure 3:
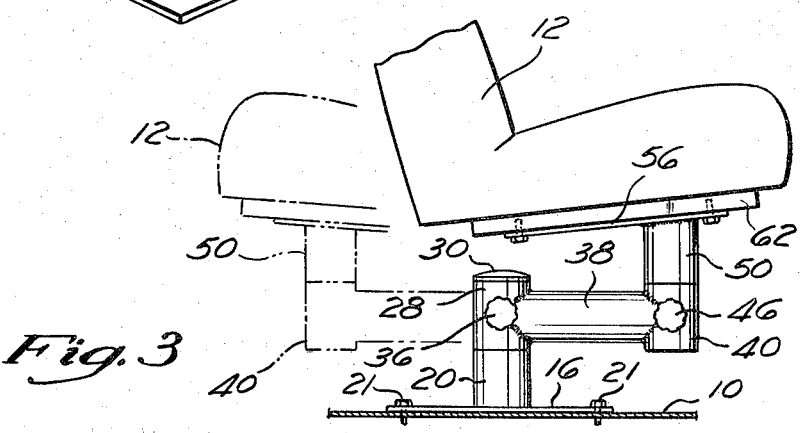
FIG. 3 is a side elevational view of the seat mounting apparatus of this invention showing its attachment to a seat.

The second post assembly 50 is fixedly mounted to an attaching plate 56. The plane of the plate 56 is located at an inclined angle with respect to the second pivot axis as is clearly shown in FIG. 3 of the drawings. This inclination is so as to locate the seat 12 at a desirable angle to facilitate a most comfortble usable position of the seat 12.

The attaching plate 56 includes a plurality of holes 58 each of which is to cooperate with conventional fastener 60. The fastener 60 is to be secured to channel members 62 and 64 which are secured to the bottom of the seat 12. Channel members 62 and 64 are deemed to be conventional portions of the seat structure and does not form any direct part of this invention.

Figure 2:
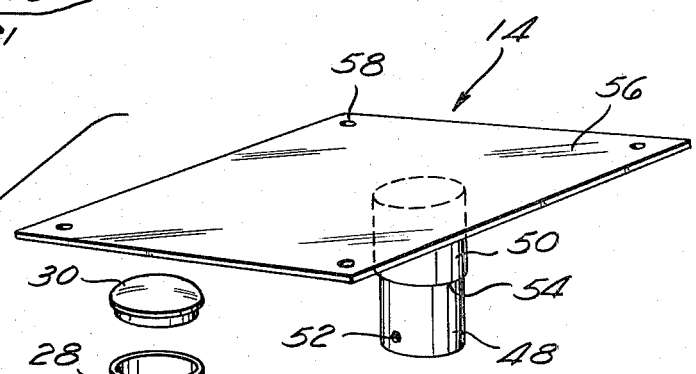
FIG. 2 is an exploded isometric view of the seat mounting apparatus of this invention.

In using the seat mounting apparatus of this invention, the user may initially establish at his option whether to locate the knobs 36 and 46 on the right hand side of the seat 12 or on the left hand side of the seat 12. This can be readily accomplished by either locating the sleeve 28 in a position shown within FIG. 2 of the drawing or by turning over the sleeve 28 so that the threaded fasteners 32 and 44 extend in the opposite direction on the opposite side of the seat 12. By securing the threaded fasteners 32 and 44 into contact with the respective smaller diametered portions 22 and 48, the seat 12 can be fixedly mounted with respect to the supportive surface 10. By loosening of the threaded fasteners 32 and 44, the seat 12 can be swiveled with respect to the sleeve 40 and swung with respect to the upright post assembly 20.

Referring particularly to FIGS. 4 and 5 of the drawing, there may be optionally employed the use of a tray attachment 66. The tray attachment 66 includes a tray 68 which has a tubular member 70 fixedly mounted on its undersurface thereof. The tubular member 70 includes a hole 72 therein. The tubular member 70 may include a wing nut assembly 74.

A rod 76 is to be capable of extending through the hole 72 and the tray 68 may be fixedly secured in respect to the rod 76 by operation of the wing nut assembly 74. Tubular member 70 is to be fixedly secured to the bottom surface of the tray 68 by means of conventional threaded fasteners 78. Threaded fasteners 78 are to be located in place by each passing through a respectively enlarged opening 80 formed within the tubular member 70.

When it is desired to not employ the use of the tray attachment 66, the rod 76 may be removed from the hole 72 and located in the tubular member 70 so that the longitudinal center axis of the rod 76 is positioned parallel to the plane of the tray 68. This position is shown in the dotted lines within FIG. 4 of the drawings. This arrangement facilitates storage of the tray 68.

The lower end of the rod 76 includes an upwardly extending member which is shown to be a key such as a cotter key 82. This cotter key 82 is to function as a stop with respect to rod 84. The lower end of the rod 76 cooperates within an opening formed within the outer end of the rod 84.

The inner end of the rod 84 is attached by means of a conventional fastener 86 to the undersurface of attaching plate 56. The fastener 86 is tightened just sufficiently so as to permit pivotal movement of the rod 84 in respect to the attaching plate 56. The usable extended position of the rod 84 as shown in solid lines in FIG. 4 and the stowed position of the rod 84 is shown in dotted lines of FIG. 4.

What is claimed is:

1. A seat mounting apparatus comprising:
   a base adapted to be secured to a supportive surface, said base having an upright post mounted thereon, said upright post defining a first axis;
   a first end of an elongated member being pivotally connected by first pivot means to said upright post, a second end of said elongated member being pivotally connected by second pivot means to a downwardly extending post, said downwardly extending post defining a second pivot axis, said second pivot axis being spaced from said first pivot axis;
   an attaching plate secured to said downwardly extending post, whereby a seat is to be mounted on said attaching plate thereby permitting the seat to swivel about said second pivot axis; and
   said first pivot axis being located perpendicular to said base, said second pivot axis being parallel to said first pivot axis, the plane of said attaching plate being inclined with respect to said second pivot axis.

2. A seat mounting apparatus comprising:
   a base adapted to be secured to a supportive surface, said base having an upright post mounted thereon, said upright post defining a first axis;
   a first end of an elongated member being pivotally connected by first pivot means to said upright post, a second end of said elongated member being pivotally connected by second pivot means to a downwardly extending post, said downwardly extending post defining a second pivot axis, said second pivot axis being spaced from said first pivot axis;
   an attaching plate secured to said downwardly extending post, whereby a seat is to be mounted on said attaching plate thereby permitting the seat to swivel about said second pivot axis;
   a supportive tray movably mounted by third means to said attaching plate, and third means comprises a first rod being pivotally mounted to said attaching plate, a second rod being pivotally mounted to said first rod, said second rod also being pivotally mounted with respect to said tray; and
   said first rod being movable between a stowage position adjacent said downwardly extending post and movable to a usable position extending outwardly from the periphery of said attaching plate, said second rod to be fixedly secured adjacent the bottom surface of said tray for stowage.

3. A seat mounting apparatus comprising:
   a base adapted to be secured to a supportive surface, said base having an upright post mounted thereon, said upright post defining a first axis;
   a first end of an elongated member being pivotally connected by first pivot means to said upright post, a second end of said elongated member being pivotally connected by second pivot means to a downwardly extending post, said downwardly extending post defining a second pivot axis, said second pivot axis being spaced from said first pivot axis; and
   an attaching plate secured to said downwardly extending post, whereby a seat is to be mounted on said attaching plate thereby permitting the seat to swivel about said second pivot axis, said second pivot axis being parallel to said first pivot axis, the plane of said attaching plate being inclined with respect to said second pivot axis.

4. The seat mounting apparatus as defined in claim 3 wherein:
   first means for fixing the position of said second elongated member to said upright post, said first means comprising a threaded member being capable of being moved into engagement with said upright post; and second means for fixing the position of said elongated member with respect to said downwardly extending post, said second means comprises a second member being movable into engagement with said downwardly extending post.

5. The seat mounting apparatus as defined in claim 4 wherein:

both said first means and said second means being mounted on one side of said elongated member, said elongated member to be reversible on said upright member so as to have said first and said second means extend in a different direction.

6. The seat mounting apparatus comprising:

a base adapted to be secured to a supportive surface, said base having an upright post mounted thereon, said upright post defining a first axis;

a first end of an elongated member being pivotally connected by first pivot means to said upright post, a second end of said elongated member being pivotally connected by said second pivot means to a downwardly extending post, said downwardly extending post defining a second pivot axis, said second pivot axis being spaced from said first pivot axis;

an attaching plate secured to said downwardly extending post, whereby a seat is to be mounted on said attaching plate thereby permitting the seat to swivel about said second pivot axis; and first means for fixing the position of said elongated member to said upright post, second means for fixing the position of said elongated member with respect to said downwardly extending post, both said first means and said second means being mounted on one side of said elongated member, said elongated member to be reversible on said upright member so as to have said first and second means extend in a different direction.

7. The seat mounting apparatus as defined in claim 6 wherein:

said second pivot axis being parallel to said first pivot axis, the plane of said attaching plate being inclined with respect to said second pivot axis.

* * * * *